United States Patent
Roach et al.

(10) Patent No.: US 9,699,045 B2
(45) Date of Patent: Jul. 4, 2017

(54) METHODS, SYSTEMS, AND COMPUTER READABLE MEDIA FOR PERFORMING DIAMETER OVERLOAD CONTROL

(71) Applicant: Tekelec, Inc., Morrisville, NC (US)

(72) Inventors: Adam Boyd Roach, Dallas, TX (US); Ben Allen Campbell, Irving, TX (US); Sam Eric McMurry, Richardson, TX (US)

(73) Assignee: Tekelec, Inc., Morrisville, NC (US)

( * ) Notice: Subject to any disclaimer, the term of this patent is extended or adjusted under 35 U.S.C. 154(b) by 200 days.

(21) Appl. No.: 13/863,351

(22) Filed: Apr. 15, 2013

(65) Prior Publication Data

US 2013/0275583 A1   Oct. 17, 2013

Related U.S. Application Data

(60) Provisional application No. 61/624,237, filed on Apr. 13, 2012.

(51) Int. Cl.
*G06F 15/173* (2006.01)
*H04L 12/26* (2006.01)
*H04L 29/06* (2006.01)

(52) U.S. Cl.
CPC .......... *H04L 43/08* (2013.01); *H04L 43/0882* (2013.01); *H04L 63/08* (2013.01)

(58) Field of Classification Search
USPC ........................................................ 709/224
See application file for complete search history.

(56) References Cited

U.S. PATENT DOCUMENTS

| 7,522,517 | B1 | 4/2009 | Johnson | |
|---|---|---|---|---|
| 8,468,267 | B2 * | 6/2013 | Yigang | H04L 47/10 709/219 |
| 8,566,474 | B2 * | 10/2013 | Kanode | H04L 63/0892 709/218 |
| 8,601,073 | B2 * | 12/2013 | Craig et al. | 709/206 |

(Continued)

FOREIGN PATENT DOCUMENTS

| EP | 2 280 520 A1 | 2/2011 |
|---|---|---|
| JP | 2011/166737 A | 8/2011 |

(Continued)

OTHER PUBLICATIONS

Communication of European publication number and information on the application of Article 67(3) EPC for European Application No. 13776083.1 (Jan. 21, 2015).

(Continued)

*Primary Examiner* — Shirley Zhang
(74) *Attorney, Agent, or Firm* — Jenkins, Wilson, Taylor & Hunt, P.A.

(57) ABSTRACT

According to one aspect, the subject matter described herein includes a system for performing Diameter overload control. The system occurs at a Diameter routing node. The system includes a network interface for receiving a Diameter message. The system also includes a Diameter overload control unit configured to detect an overload condition for a Diameter session associated with the Diameter message and to communicate an indication of the overload condition to a second Diameter node using a Diameter message defined for a purpose other than overload control.

7 Claims, 6 Drawing Sheets

(56) References Cited

U.S. PATENT DOCUMENTS

| | | | |
|---|---|---|---|
| 8,613,073 B2* | 12/2013 | McCann | H04L 63/0263 726/11 |
| 8,879,431 B2* | 11/2014 | Ridel et al. | 370/259 |
| 9,106,769 B2 | 8/2015 | Kanode et al. | |
| 9,240,949 B2 | 1/2016 | McMurry et al. | |
| 9,369,386 B2 | 6/2016 | McMurry et al. | |
| 9,391,897 B2 | 7/2016 | Sparks et al. | |
| 9,450,872 B2 | 9/2016 | Campbell et al. | |
| 2003/0200277 A1 | 10/2003 | Kim | |
| 2005/0105464 A1 | 5/2005 | Acharya et al. | |
| 2006/0069776 A1 | 3/2006 | Shim et al. | |
| 2006/0090004 A1 | 4/2006 | Nikolayev et al. | |
| 2006/0268835 A1 | 11/2006 | Hyotylainen et al. | |
| 2007/0083927 A1 | 4/2007 | Swaroop | |
| 2007/0121596 A1 | 5/2007 | Kurapati et al. | |
| 2007/0153995 A1 | 7/2007 | Fang et al. | |
| 2008/0031258 A1 | 2/2008 | Acharya et al. | |
| 2008/0170497 A1 | 7/2008 | Jeong et al. | |
| 2008/0198748 A1 | 8/2008 | Gilfix et al. | |
| 2008/0250156 A1 | 10/2008 | Agarwal et al. | |
| 2008/0253387 A1 | 10/2008 | Liang et al. | |
| 2009/0083861 A1* | 3/2009 | Jones | G06F 9/505 726/29 |
| 2009/0092131 A1 | 4/2009 | Hu et al. | |
| 2009/0185494 A1 | 7/2009 | Li et al. | |
| 2009/0232011 A1 | 9/2009 | Li et al. | |
| 2009/0265467 A1* | 10/2009 | Peles | H04L 47/10 709/226 |
| 2010/0030914 A1 | 2/2010 | Sparks et al. | |
| 2010/0211956 A1 | 8/2010 | Gopisetty et al. | |
| 2010/0299451 A1 | 11/2010 | Yigang et al. | |
| 2011/0040845 A1* | 2/2011 | Cai | H04L 47/10 709/206 |
| 2011/0061061 A1* | 3/2011 | Chen | H04L 63/08 719/313 |
| 2011/0090900 A1 | 4/2011 | Jackson et al. | |
| 2011/0116382 A1 | 5/2011 | McCann et al. | |
| 2011/0145407 A1 | 6/2011 | Pascual Avila et al. | |
| 2011/0158090 A1 | 6/2011 | Riley et al. | |
| 2011/0171958 A1 | 7/2011 | Hua et al. | |
| 2011/0200053 A1 | 8/2011 | Kanode et al. | |
| 2011/0202676 A1 | 8/2011 | Craig et al. | |
| 2011/0299395 A1 | 12/2011 | Mariblanca Nieves | |
| 2012/0044867 A1 | 2/2012 | Faccin et al. | |
| 2012/0057602 A1 | 3/2012 | Tanimoto | |
| 2012/0087368 A1 | 4/2012 | Kunarathnam et al. | |
| 2012/0131165 A1 | 5/2012 | Baniel et al. | |
| 2012/0155389 A1 | 6/2012 | McNamee et al. | |
| 2012/0203781 A1 | 8/2012 | Wakefield | |
| 2012/0221445 A1 | 8/2012 | Sharma | |
| 2012/0221693 A1 | 8/2012 | Cutler et al. | |
| 2012/0303796 A1 | 11/2012 | Mo et al. | |
| 2012/0303835 A1 | 11/2012 | Kempf et al. | |
| 2012/0307631 A1 | 12/2012 | Yang et al. | |
| 2013/0039176 A1 | 2/2013 | Kanode et al. | |
| 2013/0041994 A1 | 2/2013 | Terrien et al. | |
| 2013/0124712 A1 | 5/2013 | Parker | |
| 2013/0163429 A1 | 6/2013 | Dunstan et al. | |
| 2013/0188489 A1 | 7/2013 | Sato | |
| 2013/0223219 A1 | 8/2013 | Mir et al. | |
| 2013/0250770 A1 | 9/2013 | Zou et al. | |
| 2013/0266007 A1 | 10/2013 | Kumbhare et al. | |
| 2013/0322327 A1 | 12/2013 | Jorgensen et al. | |
| 2014/0187199 A1 | 7/2014 | Yan et al. | |
| 2014/0192646 A1 | 7/2014 | Mir et al. | |
| 2014/0310388 A1 | 10/2014 | Djukic et al. | |
| 2014/0376380 A1 | 12/2014 | Campbell et al. | |
| 2015/0036486 A1 | 2/2015 | McMurry et al. | |
| 2015/0036504 A1 | 2/2015 | McMurry et al. | |
| 2015/0036505 A1 | 2/2015 | Sparks et al. | |
| 2015/0085663 A1 | 3/2015 | McMurry et al. | |
| 2015/0149656 A1 | 5/2015 | McMurry et al. | |
| 2015/0236915 A1 | 8/2015 | Mohammed et al. | |
| 2016/0080578 A1 | 3/2016 | Stenfelt et al. | |
| 2016/0112275 A1 | 4/2016 | Park et al. | |
| 2016/0344817 A1 | 11/2016 | Renzullo et al. | |

FOREIGN PATENT DOCUMENTS

| | | |
|---|---|---|
| KR | 10-2009-0029348 | 3/2009 |
| WO | WO 2009/070179 A1 | 6/2009 |
| WO | WO 2009/129487 A2 | 10/2009 |
| WO | WO 2011/161575 A1 | 12/2011 |
| WO | WO 2012119147 A1 * | 9/2012 |
| WO | WO 2012/130264 A1 | 10/2012 |
| WO | WO 2015/017422 A1 | 2/2015 |
| WO | WO 2015/041750 A1 | 3/2015 |
| WO | WO 2015/080906 A1 | 6/2015 |

OTHER PUBLICATIONS

Commonly-assigned, co-pending International Application No. PCT/US14/66240 for "Methods, Systems, and Computer Readable Media for Diameter Routing Using Software Defined Network (SDN) Functionality," (Unpublished, filed Nov. 18, 2014).

Notification of Transmittal of the International Search Report and the Written Opinion of the International Searching Authority, or the Declaration for International Application No. PCT/US2014/048651 (Nov. 17, 2014).

Notification of Transmittal of the International Search Report and the Written Opinion of the International Searching Authority, or the Declaration for International Application No. PCT/US2014/048644 (Oct. 17, 2014).

Commonly-assigned, co-pending International Application No. PCT/US14/48651 for "Methods, Systems, and Computer Readable Media for Diameter Load and Overload Information and Virtualization," (Unpublished, filed Jul. 29, 2014).

Commonly-assigned, co-pending International Application No. PCT/US14/48644 for "Methods, Systems, and Computer Readable Media for Mitigating Traffic Storms," (Unpublished, filed Jul. 29, 2014).

Commonly-assigned, co-pending U.S. Appl. No. 14/034,478 for "Methods, Systems, and Computer Readable Media for Diameter Load and Overload Information and Virtualization," (Unpublished, filed Sep. 23, 2013).

Tschofenig, "Diameter Overload Architecture and Information Model," draft-tschofenig-dime-overload-arch-00.txt, DIME, pp. 1-9 (Jul. 16, 2013).

Notification of Transmittal of the International Search Report and the Written Opinion of the International Searching Authority, or the Declaration for International Application No. PCT/US2013/036664 (Jul. 2, 2013).

Campbell, "Diameter Overload Control Solution Issues," draft-campbell-dime-overload-issues-00, pp. 1-16 (Jun. 2013).

"3rd Generation Partnership Project; Technical Specification Group Core Network and Terminals; Study on Diameter overload control mechanisms (Release 12)," 3GPP TR 29.809 V0.3.0, pp. 1-51 (Jun. 2013).

Roach et al., "A Mechanism for Diameter Overload Control," draft-roach-dime-overload-ctrl-03, DIME, pp. 1-49 (May 17, 2013).

Korhonen et al., "The Diameter Overload Control Application (DOCA)," draft-korhonen-dime-ovl-01.txt, Diameter Maintenance and Extensions (DIME), pp. 1-18 (Feb. 25, 2013).

Fajardo et al., "Diameter Base Protocol," RFC 6733, pp. 1-152 (Oct. 2012).

McMurry et al., "Diameter Overload Control Requirements," draft-ietf-dime-overload-reqs-00, pp. 1-25 (Sep. 21, 2012).

"Open Flow Switch Specification," https://www.opennetworking.org/images/stories/downloads/sdn-resources/onf-specifications/openflow/openflow-spec-v1.2.pdf, Version 1.2 (Wire Protocol 0x03), Open Networking Foundation, pp. 1-85 (Dec. 5, 2011).

Interview Summary for U.S. Appl. No. 12/425,998 (Sep. 14, 2011).

Final Office Action for U.S. Appl. No. 12/425,998 (Jun. 8, 2011).

Interview Summary for U.S. Appl. No. 12/425,998 (Mar. 1, 2011).

Non-Final Office Action for U.S. Appl. No. 12/425,998 (Nov. 29, 2010).

(56) References Cited

OTHER PUBLICATIONS

Notification of Transmittal of the International Search Report and the Written Opinion of the International Searching Authority, or the Declaration for International Application No. PCT/US2009/041006 (Dec. 4, 2009).
Hilt et al., "Session Initiation Protocol (SIP) Overload Control," IETF, draft-hilt-sipping-overload-02, p. 1-28 (Jul. 8, 2007).
Zhang et al., "Denial of Service Attack and Prevention on SIP VoIP Infrastructures Using DNS Flooding," in Principles, Systems, and Applications of IP Telecummunications (IPTCOMM) (Jul. 2007).
Nahum et al., "Evaluating SIP Server Performance," IBM T.J. Watson Research Center, RC24183 (Feb. 2007).
Rosenberg, "Requirements for Management of Overload in the Session Initiation Protocol," IETF, draft-rosenbergy-sipping-overload-reqs-02, p. 1-22 (Oct. 2006).
Kuthan et al., "Denial of Service Attacks Targeting a SIP VoIP Infrastructure: Attack Scenarios and Prevention mechanisms," IEEE Networks Magazine, vol. 20, No. 5 (Sep. 2006).
Ohta, "Overload Protection in a SIP Signaling Network," in International conference on Internet Surveillance and Protection (ICISP), p. 1-6 (2006).
Donovan et al., "Session Timers in the Session Initiation Protocol (SIP)," Network Working Group, RFC 4028 (Apr. 2005).
Ohta, "Simulation Study of SIP Signaling in an Overload Condition," International Conference for Communications, Internet, and Information Technology, IASTED/ACTA Press, pp. 321-326 (Nov. 22-24, 2004).
Calhoun et al., "Diameter Base Protocol," RFC 3588, pp. 1-147 (Sep. 2003).
Rosenberg et al., "SIP: Session Initiation Protocol," Network Working Group, RFC 3261, http://www.ietf.org/rfc/rfc3261.txt, p. 1-252 (Jun. 2002).
Schulzrinne et al., "SIPstone—Benchmarking SIP Server Performance," (Apr. 2002).
"Signaling Flows for the IP Multimedia Call control Based on Session Initiation Protocol (SIP) and Session Description Protocol (SDP)," 3GPP TS 24.228 V1.1.0, p. 1-653 (Jul. 3-6, 2001).
Grossglauser et al., "On the Relevance of Long-Range Dependence in Network Traffic," IEEE/ACM Transactions on Networking, vol. 7, No. 5, p. 629-640 (Oct. 1999).
Notification of Transmittal of the International Search Report and the Written Opinion of the International Searching Authority, or the Declaration for International Application No. PCT/US2014/066240 (May 13, 2015).
Non-Final Office Action for U.S. Appl. No. 13/956,304 (May 4, 2015).
Non-Final Office Action for U.S. Appl. No. 13/956,307 (Apr. 23, 2015).
Non-Final Office Action for U.S. Appl. No. 13/956,300 (Apr. 8, 2015).
Notice of Allowance and Fee(s) Due and Examiner-Initiated Interview Summary for U.S. Appl. No. 13/572,156 (Apr. 6, 2015).
Non-Final Office Action for U.S. Appl. No. 14/034,478 (Mar. 23, 2015).
Final Office Action for U.S. Appl. No. 13/572,156 (Dec. 29, 2014).
Non-Final Office Action for U.S. Appl. No. 13/572,156 (May 23, 2014).
"Split Architecture for Large Scale Wide Area Networks," SPARC ICT-258457 Deliverable D3.3, pp. 1-129 (Dec. 1, 2011).
3GPP, "Digital Cellular Telecommunications System (Phase 2+); Universal Mobile Telecommunications System (UMTS); Universal Subscriber Identity Module (USIM) Application Toolkit (USAT) (3GPP TS 31.111 version 8.3.0 Release 8)," ETSI TS 131 111 V8.3.0, pp. 1-102 (Oct. 2008).
Applicant-Initiated Interview Summary for U.S. Appl. No. 14/092,898 (Jan. 14, 2016).
Non-Final Office Action for U.S. Appl. No. 14/313,610 (Jan. 11, 2016).
Extended European Search Report for European Application No. 13776083.1 (Dec. 14, 2015).
Applicant-Initiated Interview Summary for U.S. Appl. No. 13/956,300 (Jun. 29, 2015).
Notice of Allowance and Fee(s) Due for U.S. Appl. No. 14/313,610 (May 20, 2016).
Communication of European Publication Number and Information on the Application of Article 67(3) EPC for European Patent Application No. 14755208.7 (May 11, 2016).
Applicant-Initiated Interview Summary for U.S. Appl. No. 14/313,610 (Apr. 26, 2016).
Non-Final Office Action for U.S. Appl. No. 14/034,478 (Apr. 5, 2016).
Notice of Allowance and Fee(s) Due for U.S. Appl. No. 13/956,304 (Mar. 16, 2016).
Notice of Allowance and Fee(s) Due and Examiner-Initiated Interview Summary for U.S. Appl. No. 13/956,307 (Feb. 12, 2016).
Applicant-Initiated Interview Summary for U.S. Appl. No. 13/956,304 (Feb. 1, 2016).
Commonly-assigned, co-pending U.S. Appl. No. 14/918,541 for "Methods, Systems, and Computer Readable Media Diverting Diameter Traffic From an Overloaded Policy and Charging Rules Function (PCRF)," (Unpublished, filed Oct. 20, 2015).
Commonly-assigned, co-pending U.S. Appl. No. 14/735,072 for "Methods, Systems, and Computer Readable Media for Implementing Intelligent Policy and Charging Rules Function (PCRF) Overload Control," (Unpublished, filed Jun. 9, 2015).
Korhonen et al., "Diameter Overload Indication Conveyance draft-ietf-dime-ovli-06.txt," Diameter Maintenance and Extensions (DIME), https://tools.ietf.org/html/draft-ietf-dime-ovli-06, pp. 1-51 (Jan. 8, 2015).
"Multi-Protocol Routing Agent User's Guide," Policy Management, 910-6404-001 Revision A, Copyright 2012 Tekelec (Jun. 2012).
Communication of European publication number and information on the application of Article 67(3) EPC for European Patent Application No. 14755210.3 (Jul. 6, 2016).
Letter regarding notice of grant for Japanese Patent Application No. 2015-505985 (Nov. 29, 2016).
Non-Final Office Action for U.S. Appl. No. 14/735,072 (Oct. 28, 2016).
Notification of the First Office Action for Chinese Patent Application No. 201380027543.6 (Sep. 30, 2016).
Final Office Action for U.S. Appl. No. 14/092,898 (Sep. 8, 2016).
Communication of European publication number and information on the application of Article 67(3) EPC for European Application No. 14812837.4 (Sep. 7, 2016).
Letter regarding Office Action for Japanese Patent Application No. 2015-505985 (Sep. 6, 2016).
Notice of Allowance and Fee(s) Due and Examiner-Initiated Interiew Summary for U.S. Appl. No. 14/034,478 (Aug. 25, 2016).

* cited by examiner

METHODS, SYSTEMS, AND COMPUTER READABLE MEDIA FOR PERFORMING DIAMETER OVERLOAD CONTROL

PRIORITY CLAIM

This application claims the benefit of U.S. Provisional Patent Application Ser. No. 61/624,237, filed Apr. 13, 2012, the disclosure of which is incorporated herein by reference in its entirety.

TECHNICAL FIELD

The subject matter described herein relates to methods and systems for processing Diameter messages. More particularly, the subject matter described herein relates to methods, systems, and computer readable media for performing Diameter overload control.

BACKGROUND

Diameter is an authentication, authorization and accounting (AAA) protocol for computer networks, and is a successor to Radius. The Diameter base protocol is defined in International Engineering Task Force (IETF) request for comments (RFC) 3588 which is incorporated by reference herein in its entirety. Diameter messages use a per user framework and exist in the format of request-answer messages. Diameter answer messages travel back to the request source via the same path through which the request message was routed using hop-by-hop transport.

Diameter messages may be exchanged between Diameter nodes for performing various functions. For example, a mobility management entity (MME) and a home subscriber server (HSS) may interact for authentication, authorization, and/or accounting (AAA) purposes. Since communications networks use Diameter messages to perform a variety of functions, it is important to make sure that Diameter nodes are working correctly and as expected.

Accordingly, there exists a need for methods, systems, and computer readable media for performing Diameter overload control.

SUMMARY

According to one aspect, the subject matter described herein includes a system for performing Diameter overload control. The system occurs at a Diameter routing node. The system includes a network interface for receiving a Diameter message. The system also includes a Diameter overload control unit configured to detect an overload condition for a Diameter session associated with the Diameter message and to communicate an indication of the overload condition to a second Diameter node using a Diameter message defined for a purpose other than overload control.

The subject matter described herein can be implemented in software in combination with hardware and/or firmware. For example, the subject matter described herein can be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to software in combination with hardware and/or firmware for implementing features described herein.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer readable media are provided for performing Diameter overload control. Advantageously, some aspects of the present subject matter described herein can be used for managing Diameter overload (e.g., when traffic or processing load is greater than a node can or should handle) or other conditions. For example, a Diameter agent (e.g., a Diameter routing node (DRN) or a Diameter signaling router (DSR)) in accordance with aspects of the present subject matter described herein may determine an overload scope (e.g., a monitoring and/or reporting construct used for describing, specifying, defining, and/or constraining an overload event and related overload control action(s) to relevant parties, entities, or areas). In this example, Diameter sessions may be assigned to one or more Diameter overload scopes, such as a realm, an application, a host, an overload group, a session, or a connection. Depending on the overload scope(s), a Diameter agent may inform a node (e.g., an origination node) about overload related to the overload scope(s) and the node may abate or attempt to abate the overload related to the overload scope (s), e.g., by sending affected Diameter messages to another, non-overloaded node or suspending affected communications. By using overload scopes and informing relevant nodes about overload, some aspects of the subject matter described herein may be used to abate overload or related problems associated with overloaded Diameter entities (e.g., applications, nodes, groups, sessions, connections, realms, etc.) without significantly affecting other, non-overloaded Diameter entities.

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
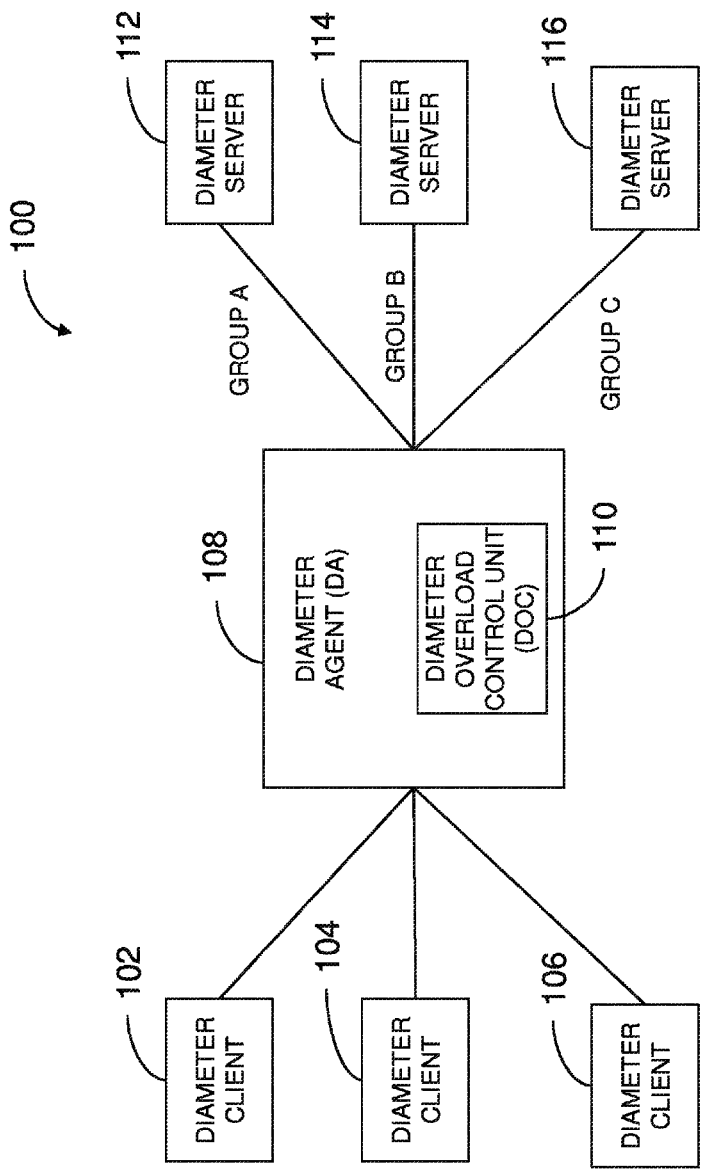
FIG. 1 is a diagram illustrating an exemplary environment for performing Diameter overload control according to an embodiment of the subject matter described herein.

FIG. 1 is a diagram illustrating an exemplary environment 100 for performing Diameter overload control according to an embodiment of the subject matter described herein. Exemplary environment 100 may include one or more networks and may include one or more Diameter nodes, such as Diameter clients 102-106, a Diameter routing node (DRN) or Diameter agent (DA) 108, and Diameter servers 112-116.

Each of Diameter clients 102-106 may represent any suitable entity (e.g., a computing platform include at least one processor and memory) for requesting one or more services from Diameter servers 112-116. For example, Diameter client 102 may send a Diameter request message for requesting one or more services at an application hosted by Diameter server 112. Each of Diameter servers 112-116 may represent any suitable entity (e.g., a computing platform include at least one processor and memory) for providing or performing one or more services for Diameter clients 102-106. For example, Diameter server 112 may send a Diameter answer message (e.g. a Diameter response message) in response to receiving and processing a Diameter request message.

Exemplary Diameter clients 102-106 or Diameter servers 112-116 may include a mobility management entity (MME), a home subscriber server (HSS), an authentication, authorization, and accounting (AAA) server, a Bearer Binding and Event Reporting Function (BBERF), a serving gateway (SGW), a packet data network gateway (PDN GW), a charging data function (CDF), an online charging system, an offline charging system, a policy charging enforcement function (PCEF), a policy charging and rules function (PCRF), a subscriber profile repository (SPR), a Diameter agent, a network node, a policy engine, a policy server, an application function (AF), an application server, a Diameter signaling agent, a long term evolution (LTE) node, an Internet protocol (IP) multimedia subsystem (IMS) network node, a server, a correlation node, a node, a database, a signaling gateway, a gateway, a monitoring node, a Diameter message processor, a data collection platform, a multi-protocol signaling gateway, a multi-protocol signaling router, or a computing platform.

DA 108 may be any suitable entity for performing Diameter overload control and/or related functions described herein. For example, DA 108 may be implemented on a computing platform with one or more processors and one or more network interfaces for receiving or transmitting messages. Examples of DA 108 may include, but are not limited to, a DSR, a DRN, a Diameter routing agent, a Diameter relay agent, a Diameter redirect agent, a Diameter translation agent, or a Diameter proxy agent.

DA 108 may include functionality for receiving, processing and/or routing various messages (e.g., protocol data units (PDUs)) and may include various communications interfaces for communication with Diameter nodes, e.g., 3rd Generation Partnership Project (3GPP) LTE communications interfaces and other (e.g., non-LTE) communications interfaces. In some embodiments, receiving, processing, and/or routing functionality may be included in one or more modules. For example, DA 108 may include or have access to one or more modules for receiving Diameter signaling messages associated with multiple different Diameter signaling interfaces, e.g., S9, S6a, S11, Cx, and Dx.

In some embodiments, DA 108 may receive Diameter messages via other Diameter interfaces. For example, DA 108 may receive Diameter messages via an LTE interface, an IMS interface, an IETF specification interface, a 3GPP specification interface, a Third Generation Partnership Project 2 (3GPP2) specification interface, a European Telecommunications Standards Institute (ETSI) specification interface, an International Telecommunications Union (ITU) specification interface, a PacketCable specification interface, a MultiService Forum (MSF) specification interface, an Sh interface, a Dx interface, a Ro interface, a Rf interface, an Sp interface, a Gx interface, a Rx interface, a Gz interface, a Gy interface, a Gq interface, a Zh interface, a Dz interface, a Zn interface, a Ty interface, a Tx interface, a Dw interface, a Wa interface, a Wd interface, a Wx interface, a Wm interface, a Wg interface, a Pr interface, a Gr interface, a Gr+ interface, a Gi interface, a Wo interface, a Wf interface, a Re interface, an S6 interface, an S2 interface, an SW interface, an Sta interface, an S7 interface, an H2 interface, an E2 interface, an E4 interface, an E5 interface, a A3 interface, a A4 interface, a Rr interface, a Gq' interface, a TC-6 interface, a TC-7 interface, a TC-8 interface, a TC-9 interface, a TC-10 interface, a TC-11 interface, a DB-0 interface, a DB-2 interface, a BI-1 interface, a LOC-1 interface, an Rw interface, a Pkt-mm-2 interface, a P-CSCF-PAM interface, a Pkt-laes-2 interface, an MM10 interface, an MZ interface, a Gmb interface, or a Zn' interface.

DA 108 may facilitate communication between Diameter clients 102-106 and Diameter servers 112-116. For example, Diameter client 102 may send a Diameter request message (e.g., a Diameter session establishment request message) to DA 108. The Diameter request message may require one or more services from Diameter servers 112. DA 108 may route, relay, and/or translate requests or responses between Diameter client 102 and a Diameter server 112. After receiving and processing the Diameter request message, Diameter server 112 may send a Diameter response message (e.g., a Diameter session establishment response message) to DA 108. The Diameter response message may be in response to a Diameter request message originated by Diameter client 102. DA 108 may provide the Diameter response message to Diameter client 102.

DA 108, or a module therein, may perform one or more functions prior to providing a Diameter message to another node. For example, prior to providing a Diameter response message to Diameter client 102, DA 108, or a module therein, may modify the Diameter message by inserting or including Diameter overload control information or other related data in the modified Diameter message. In some embodiments, Diameter overload control information may be stored in one or more attribute value pairs (AVPs) located in a payload portion of the modified Diameter message.

DA 108 may include a Diameter overload control unit (DOC) 110. DOC 110 may be any suitable entity (such as a module or software executing on a processor) for performing Diameter overload control, overload management, and/or related functions. For example, DOC 110 may be configured to control or attempt to abate overload or other problems associated with overloaded Diameter servers 112-116. DOC 110 may be configured to determine one or more Diameter overload scopes. Diameter overload scopes may include a realm, application, host, overload group, session, or connection. For example, DOC 110 may assign each Diameter session to an overload group corresponding to the Diameter servers that are assigned to service requests for particular sessions.

In some embodiments, DOC 110 may determine an overload scope to be communicated to other nodes based on network topology and the relationships between the sessions, nodes, and the topology. For example, if connections from a particular realm cause overload, the overload scope that is communicated upstream may be selected to be "realm" so as to throttle traffic from that realm. In another example, if individual connections or sessions result in overload and no other connections or sessions are causing overload, the scope of the overload may be set to "connection" or "session" to throttle traffic from the corresponding connections or sessions, while allowing other connections or sessions to continue sending traffic without throttling.

DOC 110 may be configured to monitor or detect overload from one or more Diameter nodes, realms, applications, or other entities. For example, DOC 110 may subscribe to Diameter servers 112-116 or may periodically or aperiodically (e.g., dynamically based on certain factors) poll Diameter servers 112-116 for overload information. In this example, when DA 108 or DOC 110 receives an indication that one of the Diameter servers is overloaded, DA 108 or DOC 110 may send messages to each of Diameter clients 102-106 indicating that the Diameter overload group is overloaded.

In some embodiments, DOC 110 may be configured to provide or utilize some information on a hop-by-hop basis. For example, as a Diameter request message progresses through a network, an intermediary node may remove Diameter overload control information (e.g., stored in a Load-Info AVP) provided by a previous node or hop and may use the Diameter overload control information. In this example, the intermediary node may change or modify received Diameter overload control information and may re-insert some modified information in its own Load-Info AVP, e.g., prior to forwarding the message to another node.

In some embodiments, when sending a response to a node that supports overload control or overload management, a node (e.g., DA 108 or one of Diameter servers 112-116) may include one or more Load-Info AVP with overload-related and load-related information. In some embodiments, if multiple Load-Info AVPs are present, each Load-Info AVP may be associated with different overload scopes.

In some embodiments, Diameter client 102-106 may take various actions in response to learning an upstream node (e.g., DA 108 or one of Diameter servers 112-116) is overloaded. Exemplary actions may include client prioritization of certain types of requests over others, selection of an alternate peer (e.g., as long as the overload properties of that peer are honored) for processing, sending an error message, or dropping or discarding the Diameter message. In some embodiments, Diameter clients 102-106 may perform any actions necessary to shape its traffic according to provided overload control information, such as overload metrics or load abatement procedures provided in an Overload-Control-Metric AVP.

In some embodiments, Diameter clients 102-106 may use Diameter overload control information in selecting a most desirable (e.g., the least-loaded available) Diameter server 112.

In some embodiments, DA 108 may take various actions in response to learning an upstream node (e.g., one of Diameter servers 112-116) is overloaded. Exemplary actions may include instructing a client to perform one or more actions, prioritization of certain types of requests over others, selection of an alternate peer (e.g., as long as the overload properties of that peer are honored), sending an error message (e.g., a DIAMETER_UNABLE_TO_DELIVER message, a DIAMETER_PEER-_IN_OVERLOAD message, a Diameter_TOO_BUSY message, or a transient failure message), or dropping or discarding the Diameter message. In some embodiments, Diameter clients 102-106 may perform any actions necessary to shape its traffic according to provided overload control information, such as metrics provided in an Overload-Control-Metric AVP.

In some embodiments, DA 108 may use Diameter overload control information in selecting a desirable (e.g., the least-loaded or least overloaded available) Diameter server 112.

In some embodiments, DA 108 and/or other overload-aware nodes may be configured for rapid processing of Diameter messages containing Diameter overload control information or related AVPs. For example, less common overload scopes and/or related AVPs may be ignored or associated processing may be truncated.

In some embodiments, Diameters messages may be constructed such that intermediary nodes can quickly determine whether a message contains overload control related information, e.g., without parsing all the AVPs. For example, a new bit or command flag may be set in a header portion of a Diameter message when Diameter overload control information is present or a Diameter message may position Load-Info AVP 200 as a first AVP in its Diameter payload portion.

While FIG. 1 depicts DA 108 communicating with (e.g., receiving Diameter messages from) various Diameter nodes, it will be appreciated that DA 108 may communicate with the nodes depicted and other nodes (not depicted) via additional and/or different interfaces. It will also be appreciated that DA 108 may include fewer, additional, or different modules and/or components.

Figure 2:
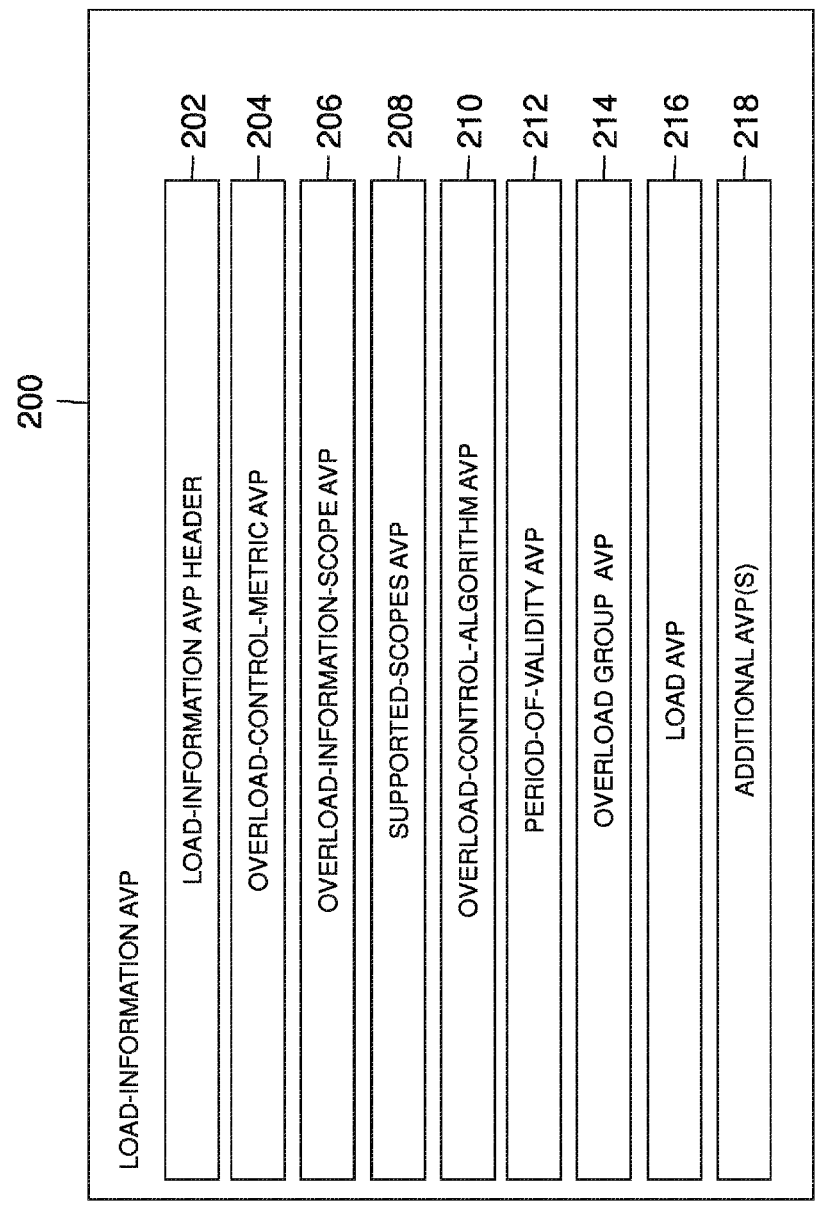
FIG. 2 is a diagram illustrating exemplary Diameter overload control information according to an embodiment of the subject matter described herein.

FIG. 2 is a diagram illustrating exemplary Diameter overload control information according to an embodiment of the subject matter described herein. Exemplary Diameter overload control information may be stored in a Diameter message and may be used in performing one or more aspects associated with Diameter overload control. For example, Diameter overload control information may be stored in an attribute value pair (AVP), such as a Load-Information (Load-Info) AVP 200, and may be located in a data or payload portion of a Diameter message. In some embodiments, Load-Info AVP 200 may be a grouped or compound AVP and may contain one or more AVPs for storing overload control information or related information.

In some embodiments, Diameter overload control information or Load-Info AVP 200 may be inserted into various Diameter messages. For example, Load-Info AVP 200 may be included in Diameter messages originating from a Diameter node that is overload-aware or that includes DOC 110.

Referring to the embodiment illustrated in FIG. 2, Load-Info AVP 200 may include a Load-Info Header AVP 202, an Overload-Control-Metric AVP 204, an Overload-Information-Scope AVP 206, a Supported-Scopes AVP 208, an Overload-Control-Algorithm AVP 210, a Period-Of-Validity AVP 212, a session group or overload group AVP 214, a Load AVP 216, and/or additional AVP(s) 218.

Load-Info Header AVP 202 may contain any information for identifying Load-Info AVP 200 and/or related (e.g., contained) AVPs. For example, Load-Info Header AVP 202 may include a header identifier and/or other information, such as value indicating the length or size of Load-Info AVP 200 or a number of contained AVPs in Load-Info AVP 200.

Overload-Control-Metric AVP 204 may contain any information for determining overload and/or may include a load abatement procedure or other actions associated with overload control. The information provided in Overload-Control-Metric AVP 204 may differ depending on a current level of load and/or on the overload algorithm implemented. For example, Overload-Control-Metric AVP 204 may indicate a percentage of requests that should be dropped or not sent, when using a "message drop" algorithm. In another example, Overload-Control-Metric AVP 204 may indicate a maximum number of requests to send per second, when using a "rate control" algorithm. In some embodiments, information provided in Overload-Control-Metric AVP 204 may be valid for all or some requests in an indicated Diameter overload scope.

In some embodiments, Overload-Control-Metric AVP 204 may utilize an Unsigned32 data type format. In some embodiments, Overload-Control-Metric AVP 204 may be the first (non-header) AVP in Load-Info AVP 200 and may appear exactly once per Load-Info AVP 200.

Overload-Information-Scope AVP 206 may contain any information (e.g., Diameter overload scope information) for determining a Diameter overload scope or context, e.g., usable for indicating to a sender which Diameter entity overload information is relevant. For example, Overload-Information-Scope AVP 206 may indicate a subset of requests to which overload information and/or overload control procedures should be applied. Overload-Information-Scope AVP 206 may include a scope type and details portions. In some embodiments, Overload-Information-Scope AVP 206 may be the second (non-header) AVP in Load-Info AVP 200 and may appear exactly once per Load-Info AVP 200. Additional information associated with Overload-Information-Scope AVP 206 is discussed with regard to FIG. 3.

Supported-Scopes AVP 208 may contain any information for indicating Diameter overload scopes that can be supported, e.g., by a Diameter node. For example, Supported-Scopes AVP 208 may indicate a subset of Diameter overload scopes, such as a realm, an application, a host, an overload group, a session, or a connection. In some embodiments, Supported-Scopes AVP 208 may be included in Capabilities-Exchange-Request (CER) messages or Capabilities-Exchange-Answer (CEA) messages.

In some embodiments, Supported-Scopes AVP 208 may utilize an Unsigned64 data format. Supported-Scopes AVP 208 may contain a bitmap indicating the scopes supported by the client. For example, support for an initial six scopes (e.g., a realm, an application, a host, an overload group, a session, or a connection) may be mandatory and may not be signaled (i.e., included in the bitmap). In this example, a least significant bit may indicate support for a seventh scope, with each subsequent bit representing another scope type. In embodiments using an Unsigned64 data format; Supported-Scopes AVP 208 may allow for up to 72 total scopes to be supported (including the initial six scopes). In some embodiments, new Diameter overload scopes may be defined via additional extensions. Supported-Scopes AVP 208 may be omitted (e.g., from Load-Info AVP 200) if no extension scopes are supported.

Overload-Control-Algorithm AVP 210 may contain any information for indicating an algorithm or procedure for reducing, shedding, or abating load. For example, Overload-Control-Algorithm AVP 210 may indicate a "message loss" algorithm, where when a node is overloaded, the node discards received messages. In another example, Overload-Control-Algorithm AVP 210 may indicate a "rate control" algorithm, where a transmission or reception rate is throttle if a rate value exceeds a threshold value or range. In yet another example, Overload-Control-Algorithm AVP 210 may indicate an algorithm that instructs a sender to stop sending communications or to send communications to another node for processing. In some embodiments, Overload-Control-Algorithm AVP 210 may be included in CER messages or CEA messages.

Period-Of-Validity AVP 212 may contain any information for indicating how long an overload-aware node should act on Diameter overload control information. For example, Period-Of-Validity AVP 212 may indicate a number of seconds in which one or more actions (e.g., an overload control metric or a load abatement procedure) should be enforced. In some embodiments, Period-Of-Validity AVP 212 may be optional or may be required if Overload-Control-Metric AVP 204 is non-zero.

Overload group AVP 214 may contain any information for identifying or associating a group of sessions independent of other Diameter overload scope entities or constructs (e.g., realms, hosts, applications, etc.). For example, Overload group AVP 214 may indicate a number of Diameter messages or related sessions that can be reported on independently from applications, realms, or other scopes. In some embodiments, Overload group AVP 214 may be optional and/or may appear in a first Diameter request or response in a session. In some embodiments, a Diameter overload group identified in Overload group AVP 214 may persist unchanged for the duration of a session or a plurality of sessions. In some embodiments, Overload group AVP 214 may utilize a human-readable text format, such as a UTF8String data format.

In some embodiments, Overload group AVP 214 may be utilized when a Diameter node is overloaded for some requests but not all possible requests. For example, if DA 108 supports more than one realm, DA 108 may route traffic to one set of nodes for realm "A", and another set of nodes for realm "B". If the realm "A" servers are overloaded but the realm "B" servers are not, then DA 108 is effectively overloaded for realm A but not for realm B. In this example, DA 108 may provide an indication of overload for the realm "A" servers so that originating nodes may perform one or more actions to lessen the load on the overloaded realm "A" servers. Similar situations may arise in nodes that need to make use of external resources for certain applications but not for others.

Load AVP 216 may contain any information for specifying load information or load metrics. In some embodiments, various algorithms may be used to generate load metrics. Some algorithms may generate load metrics that reflect utilization of a most constrained resource and may be a linear representation of such utilization. For example, load metrics may indicate a percentage of resources utilized or available at a Diameter node. In some embodiments, Load AVP 214 may utilize an Unsigned32 data type format and may include a number between 0 and $2^{32}-1$ (4,294,967,295) for representing load, where 0 is "completely unloaded" 4,294,967,295 is "maximum capacity". In some embodiments, Load AVP 214 may be optional and/or may appear exactly once per Load-Info AVP 200.

In some embodiments, if Load AVP 216 contains a value greater than zero, overload procedures may be in effect and a client may be instructed to take actions according to a negotiated overload control algorithm or procedure. In some embodiments, if Load AVP 216 is not included in Load-Info AVP 200, a previously established load value may be used.

In some embodiments, Load AVP 216 may be used to avoid overload scenarios when possible (rather than react to an ongoing overload situation). Information provided in Load AVP 216 may also be usable by peers to select among several otherwise equivalent servers. For example, information provided in Load AVP 216 may be applied as a weighting factor to a server selection algorithm used by DA 108. In another example, information provided in Load AVP 216 may be used by peers to independently implement back-off algorithms (e.g., queuing messages based on a certain ideal reception or transmission rate, pushback, or other techniques).

TABLE 1

| Server | Load | SRV Weight |
|---|---|---|
| A | 10% | 20 |
| B | 40% | 20 |
| C | 80% | 60 |

In some embodiments, load information in Load AVP 216 may be usable to distribute load between various nodes. For example, consider servers "A", "B", and "C" having communicated load information as shown in Table 1 to DA 108 or Diameter client 102. DA 108 or Diameter client 102 may apply loading information to domain name server (DNS) service record (SRV) weights as follows: Server "A": (100%−10%)×20=18, Server "B": (100%−60%)×20=12, Server "C": (100%−80%)×60=12. DA 108 or Diameter client 102 may then distribute load according to this 18/12/12 metric (e.g., 43% of traffic goes to server "A" and 28.5% goes to each of servers "B" and "C"). In other examples, load values may be applied to any capacity weighting information, e.g., information different from DNS SVR weights in Table 1.

Additional AVP(s) 218 may represent any other AVP for storing Diameter overload control related information. For example, a Load-Back-Up AVP may indicate a secondary node for processing Diameter request messages in case a current node becomes overloaded.

While FIG. 2 depicts exemplary Diameter overload control information, including Load-Info AVP 200 and various other AVPs, it will be appreciated that some Diameter overload control information may include fewer, additional, or different AVPs or information.

Figure 3:
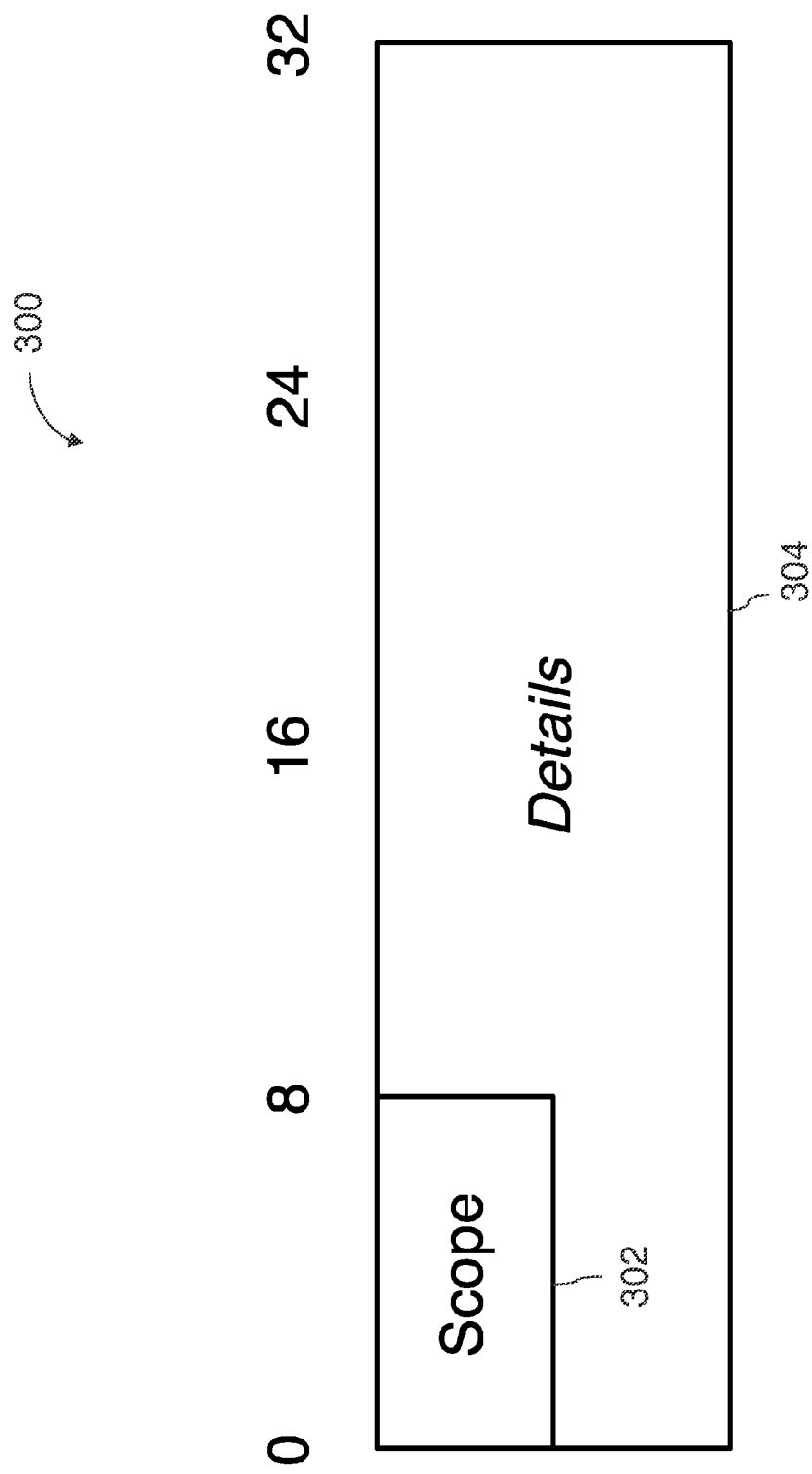
FIG. 3 is a diagram illustrating exemplary Diameter overload scope information according to an embodiment of the subject matter described herein.

FIG. 3 is a diagram illustrating exemplary Diameter overload scope information 300 according to an embodiment of the subject matter described herein. Diameter overload scope information 300 may be stored in a Diameter message and may be used in performing one or more aspects associated with Diameter overload control. For example, Diameter overload scope information 300 may be stored in an attribute value pair (AVP), such as Overload-Information-Scope AVP 206, and may be located in a data or payload portion of a Diameter message. In some embodiments, Diameter overload scope information 400 may be stored in a 32-bit OctetString data type AVP and may be nested in another AVP, such as Load-Info AVP 200.

In some embodiments, Diameter overload scope information 400 or related AVPs may be inserted into various Diameter messages. For example, Load-Info AVP 200 may be included in any Diameter messages originating from a Diameter node that is overload-aware or that includes DOC 110.

Referring to the embodiment illustrated in FIG. 3, Diameter overload scope information 300 may include a scope portion 302 and a details portion 304. Scope portion 302 may include any information for indicating one or more Diameter overload scope types. For example, scope portion information may be values, bits, flags, or text. Exemplary scope types may include a destination-realm, an application, a destination-host, an overload group, a connection, and a session.

Details portion 304 may include any information for defining or describing a Diameter overload scope. In some embodiments, details portion 304 may be included in an AVP and stored in various data formats, such as human-readable text like a UTF8String data format or an OctetString data format. For example, details portions 304 associated with an application scope type may include an Application-ID AVP for identifying a particular application. Details portions 304 associated with a realm scope type may include a Diameter identity (e.g., a fully qualified domain name (FQDN)) or related AVP for identifying a particular realm. Details portions 304 associated with an overload group type may include a group name and/or related AVP for identifying a particular overload group. Details portions 304 associated with a session scope type may include a Session-ID and/or related AVP for identifying a particular session. Details portions 304 associated with a connection scope type may include information for identifying a particular session.

In some embodiments (e.g., where multiple scopes are present or utilized), information associated with different overload scope types may be logically and-ed (∧) together. For example, if a Diameter session is associated with a destination-realm scope and an application scope, Diameter overload control information (e.g., load abatement procedures) may be applied for Diameter messages that match both the realm and the application.

In some embodiments (e.g., where multiple scopes are present or utilized), information associated with similar overload scope types may be logically or-ed (∨) together. For example, if a Diameter session is associated with a destination-realm scope and an application scope, Diameter overload control information (e.g., load abatement procedures) may be applied for Diameter messages that match either the realm or the application.

Figure 4:
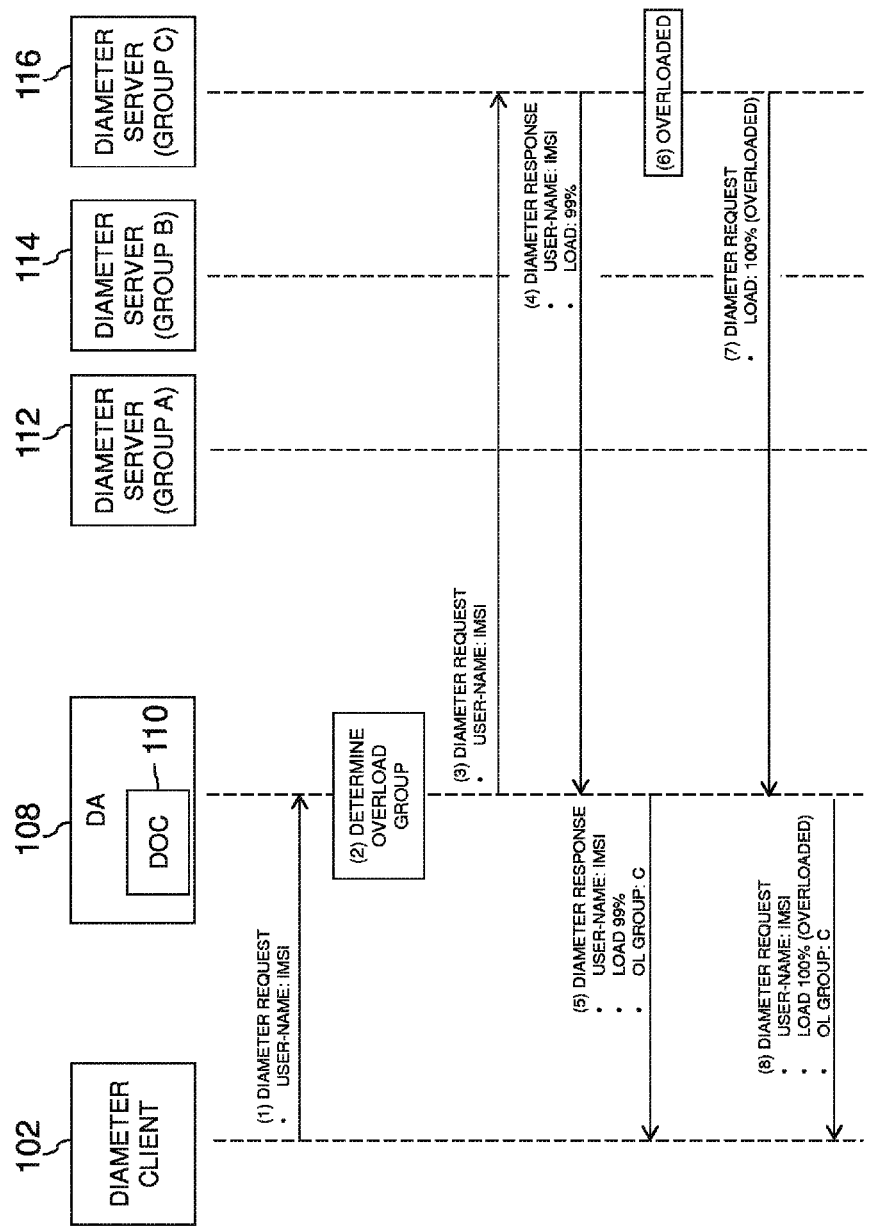
FIG. 4 is a diagram illustrating exemplary messages associated with Diameter overload control according to an embodiment of the subject matter described herein.

FIG. 4 is a diagram illustrating exemplary messages associated with Diameter overload control according to an embodiment of the subject matter described herein. In the embodiment illustrated in FIG. 4, Diameter client 102 and Diameter servers 112-116 may communicate using DA 108. In some embodiments, Diameter client 102 and Diameter servers 112-116 may be overload-aware (e.g., may include DOC 110 and/or related functionality). For example, Diameter client 102 or Diameter servers 112-116 may determine or be aware of overload scopes for various messages or sessions, may perform load abatement procedures or other actions in response to indications of overload, and/or may generally be capable of using, reading, and/or providing Diameter overload control information.

At step 1, a Diameter request message may be sent from Diameter client 102 to DA 108. For example, DA 108 may receive a session establishment request from Diameter client 102 that require services from one of a plurality of Diameter servers 112-116. In this example, Diameter client 102 may have no visibility of Diameter servers 112-116.

At step 2, DA 108 may receive the Diameter request message and determine an overload group and/or determine one or more of Diameter servers 112-116 for performing services associated with the Diameter request message. In some embodiments, DA 108 may send one or more messages (not shown) to Diameter client 102 and/or other nodes for identifying a determined overload group and/or for monitoring an entity for overload. For example, DA 108 may assign a Diameter session associated with a received Diameter message to an overload group. In this example, it is assumed that each session is assigned to an overload group corresponding to the Diameter servers that are assigned to service requests for particular sessions. In this example, DA 108 may determine that the Diameter request message is associated with overload group "C" and is to be processed by server 116.

At step 3, DA 108 may route, relay, or otherwise provide the Diameter request message to Diameter server 116. In some embodiments, the Diameter request message may be modified to include Diameter overload control information, such as an overload scope associated with the message and a load metric associated with DA 108. Diameter server 116 may receive the Diameter request message and perform various services associated with processing the Diameter request message. After processing the Diameter request message, Diameter server 116 may send a Diameter response message and may include various overload control information.

In some embodiments, when DA 108 learns that a next upstream node is overloaded, DA 108 may perform one or more actions for shaping relevant traffic (e.g., so as to minimize or abate load associated with the upstream node). In some embodiments, reporting overload may correspond to an appropriate overload context or scope. For example, if an application "R" is overloaded at Diameter server 114, but an application "S" at Diameter server 114 is not overloaded, DA 108 may inform one or more nodes about overload at Diameter server 114 with an overload scope type of "Application" and may indicate that only Application "R" is overloaded. In this example, Diameter clients 102-106 may receive the indication and throttle only traffic that is requesting application "R" at Diameter server 114. In another example, absent other natural divisions (application, realm, etc.), DA 108 may assign each of Diameter servers 112-116 to their own "Overload Contexts". In this example, in response to receiving an indication of overload for a certain Diameter server 114, Diameter clients 102-106 may perform one or more actions to lessen or abate load at Diameter session 114.

In some embodiments, Diameter servers 112-116 may include functionality for performing one or more aspects associated with Diameter overload control. For example, Diameter servers 112-116 may be overload-aware. Diameter servers 112-116 may be configured to push back on received traffic by sending overload indications to peers. For example, Diameter servers 112-116 may be configured to report load metrics (e.g., a percentage of resources utilized or left) to DA 108, Diameter clients 102-106, or other nodes. Decisions associated with reporting overload metrics (e.g., what to report and to whom) may be determine by local server policy, a remote node, or an operator.

In some embodiments, when overloaded, Diameter servers 112-116 may be configured to reject transactions from non-overload-aware peers at a same rate that they would be suppressed if they did support overload control. By rejecting transactions, Diameter servers 112-116 may prevent overload-aware peers from being "starved out" by peers that do not support overload management. If capacity is outstripped despite sending overload indications, Diameter servers 112-116 may be configured to reject transactions even if they originate from overload-aware nodes.

At step 4, a Diameter response message may be sent from Diameter server 116 to DA 108. The Diameter response message may include Diameter overload control information, such as a load metric indicating that 99% of resources at Diameter server 116 are being utilized.

At step 5, DA 108 may route, relay, or otherwise provide the Diameter response message to Diameter client 102. In some embodiments, the Diameter response message may be modified to include Diameter overload control information, such as an overload scope associated with the message and a load metric associated with DA 108.

In some embodiments, when DA 108 receives an indication that one of Diameter servers 112-116 is overloaded, DA 108 may send messages to each of Diameter clients 102-106 indicating the Diameter overload group is overloaded. In some embodiments, Diameter overload control information may "piggyback" or be inserted in existing Diameter messages traversing DA 108, such as a Diameter response message from Diameter server 116. After receiving an indication of overload, each of Diameter clients 102-106 that has sessions corresponding to the overloaded overload group may throttle traffic (e.g., Diameter messages) corresponding to that overload group. Traffic corresponding to the remaining overload groups (e.g., groups that are not overloaded) may not be throttled.

At step 6, Diameter server 116 may become overloaded. For example, Diameter server 116 may determine that 100% of its resources are being utilized or that no additional messages can be handled. In response, a Diameter message (e.g., a Device-Watchdog-Request (DWR) or Device-Watchdog-Answer (DWA) message) may be sent to one or more nodes, such as DA 108 or Diameter clients 102-106. In some embodiments, DWR messages and DWA messages may be used to allow exchange of load information during otherwise quiescent connections.

At step 7, a Diameter request message containing Diameter overload control information (e.g., Load-Info AVP 200) may be sent from Diameter server 116 to DA 108. The Diameter overload control information may include various types of overload related information, such as indication of overload, an overload group (the same as or different from an overload group determined by DA 108), a period of validity, and any other relevant information.

At step 8, DA 108 may route, relay, or otherwise provide the Diameter request message to Diameter client 102. In some embodiments, the Diameter request message may be modified to include Diameter overload control information, such as an overload scope associated with the message and an overload control algorithm for shedding or abating load at Diameter server 116.

Diameter client 102 may receive the Diameter request message containing the Diameter overload control information. In response to receiving the Diameter overload control information, Diameter client 102 may stop communicating with Diameter server 116 for a period of time (e.g., based on an associated period of validity associated with the Diameter overload control information) or another action that abates load at Diameter server 116. For example, traffic to Diameter server 116 corresponding to overload group "C" may be throttled by Diameter client 102. In this example, Diameter client 102 may continue to fully utilize Diameter servers 112 and 116 corresponding to Groups A and B.

Figure 5:
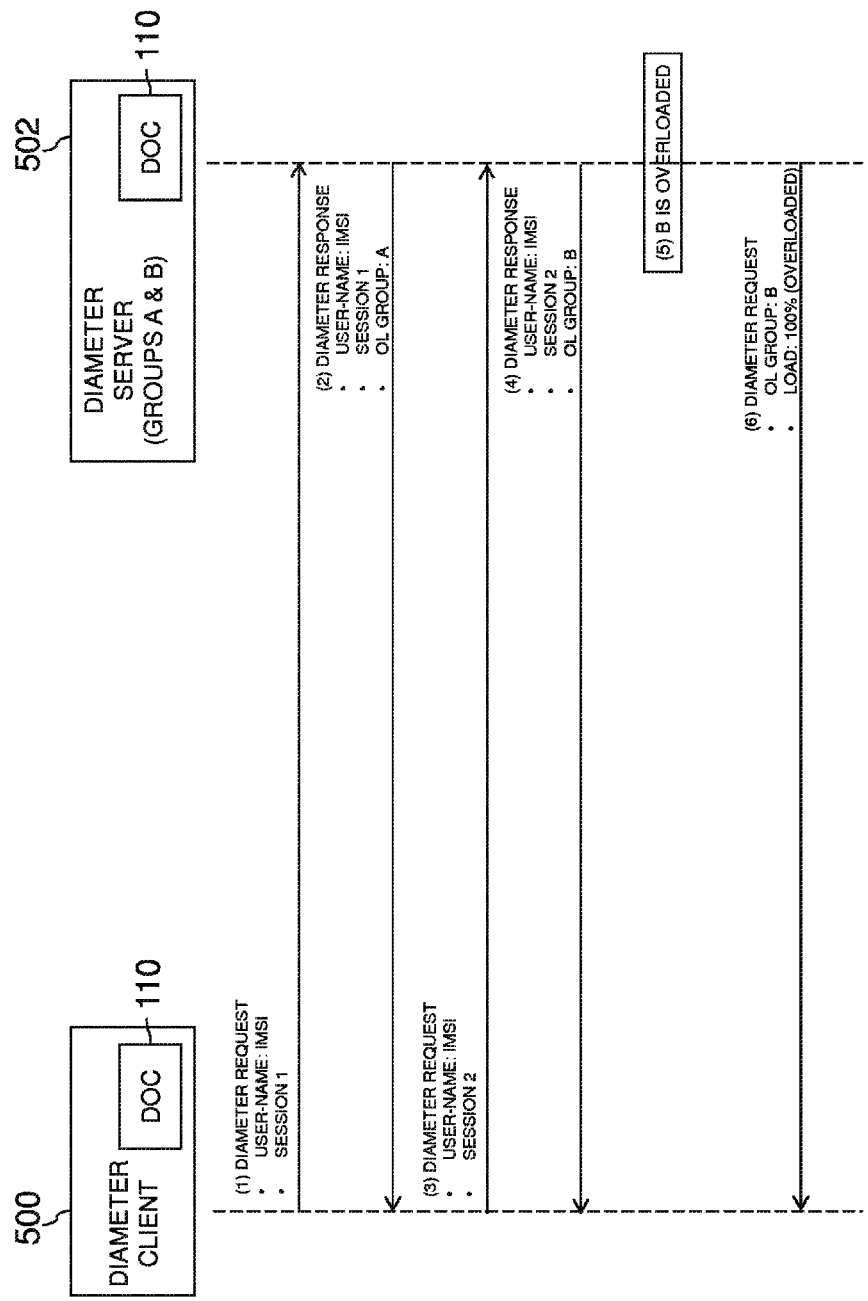
FIG. 5 is a diagram illustrating exemplary messages associated with Diameter overload control according to another embodiment of the subject matter described herein.

FIG. 5 is a diagram illustrating exemplary messages associated with Diameter overload control according to another embodiment of the subject matter described herein. In the embodiment illustrated in FIG. 5, Diameter client 500 and Diameter server 502 may communicate without using an intermediary node, e.g., DA 108. In some embodiments, Diameter client 500 and Diameter server 502 may include similar functionality as described above for Diameter client 102 and Diameter server 112, respectively. In some embodiments, Diameter client 500 and Diameter server 502 may be overload-aware (e.g., may include DOC 110 and/or related functionality). For example, Diameter client 500 or Diameter server 502 may determine or be aware of overload scopes for various messages or sessions, may perform load abatement procedures or other actions in response to an indication of overload, and/or may generally be capable of using, reading, or providing Diameter overload control information.

At step 1, a Diameter request message may be sent from Diameter client 500 to Diameter server 502. For example, Diameter request message may request subscriber information from a SPR at Diameter server 502.

Diameter server 502 may receive the Diameter request message and determine an overload group associated with the Diameter request message and/or a related Diameter session. In some embodiments, overload groups or other overload scopes can be applied or assigned based on available information. For example, Diameter server 502, or DOC 110 therein, may assign messages and/or related sessions based on whether Diameter server 502 can handle requests using random access memory (RAM) resources or requests need an on-disk local database consultation. In this example, requests that can be handled using RAM resources without the need to consult an on-disk local database may be assigned to an overload group "A" and requests that can be handled but need access to the on-disk local database may be assigned to overload group "B".

At step 2, a Diameter response message may be sent from Diameter server 502 to Diameter client 500. The Diameter response message may include Diameter overload control information, such as an overload group (e.g., overload group "A") and a load metric indicating that 99% of resources at Diameter server 502 are being utilized. Diameter client 500 may receive the Diameter response message and process the Diameter response message accordingly. For example, Diameter client 500 may send subsequent Diameter messages to Diameter server 502. In another example, Diameter client 500 may attempt to find another, less overloaded Diameter server in response to learning Diameter server 502 is almost completely overloaded.

At step 3, another Diameter request message may be sent from Diameter client 500 to Diameter server 502. For example, Diameter request message may be a request for extensive subscriber information from a SPR at Diameter server 502.

Diameter server 502 may receive the Diameter request message and determine an overload group associated with the Diameter request message and/or a related Diameter session. For example, Diameter server 502, or DOC 110 therein, may assign the Diameter request message and/or a related session to an overload group "B" because the Diameter request message may require consulting an on-disk local database.

At step 4, another Diameter response message may be sent from Diameter server 502 to Diameter client 500. The Diameter response message may include Diameter overload control information, such as an overload group (e.g., overload group "B") and a load metric indicating that 99% of resources at Diameter server 116 are being utilized. Diameter client 500 may receive the Diameter response message and process the Diameter response message accordingly.

At step 6, Diameter server 502 may become overloaded. Diameter server 502 may determine that 100% of its resources are being utilized or that no additional messages can be handled. In an example where sessions are assigned overload groups "A" and "B" based on whether requests require a local database or whether requests require only RAM resources, when Diameter server 502 experiences overload due to I/O bottlenecks associated with the local database, but can service requests for sessions only require RAM resources, Diameter server 502 may send an overload notification message for group B and not group A. For example, a Diameter message (e.g., Device-Watchdog-Request message) may be sent.

At step 7, a Diameter request message containing Diameter overload control information (e.g., Load-Info AVP 200) may be sent from Diameter server 502 to Diameter client 500. The Diameter overload control information may include various types of overload related information, such as indication of overload, an overload group (e.g., overload group "B"), a period of validity, and any other relevant information.

Diameter client 502 may receive the Diameter request message containing the Diameter overload control information. In response to receiving the Diameter overload control information, Diameter client 502 may throttle requests for overload group "B" without throttling communications associated with overload group "A".

Figure 6:
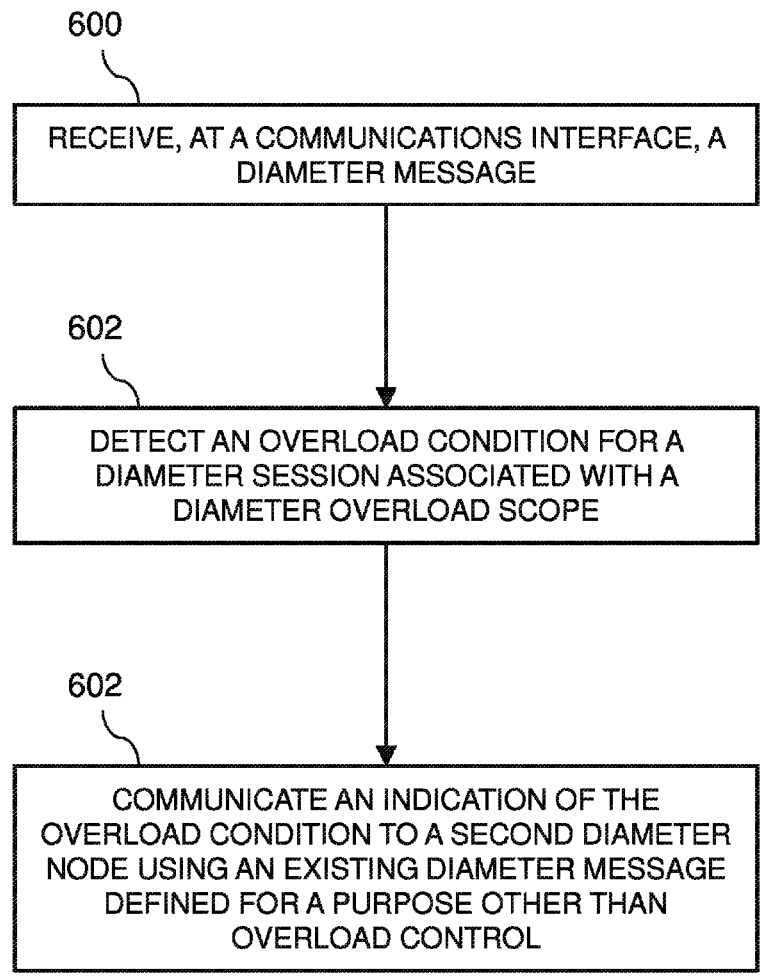
FIG. 6 is a flow chart illustrating an exemplary process for performing Diameter overload control according to an embodiment of the subject matter described herein.

FIG. 6 is a flow chart illustrating an exemplary process for performing Diameter overload control according to an embodiment of the subject matter described herein. In some embodiments, the exemplary process described herein, or portions thereof, may be performed at or performed by DA 108, DOC 110, a Diameter agent, Diameter server 112, Diameter client 102, a Diameter node, and/or another module or node.

Referring to the embodiment illustrated in FIG. 6, at step 600, a Diameter message may be received at or via a communications interface. For example, a Diameter request message originating from Diameter client 102 may be received at DA 108.

At step 602, an overload condition for a Diameter session associated with the Diameter message may be detected. For example, an application 'X' may be overloaded and the Diameter message may be part of a Diameter session requesting processing from or using application 'X'.

At step 604, an indication of the overload condition may be communicated to a second Diameter node using an existing Diameter message, e.g., a DWA message, a DWR message, a CER message, a CEA message, or any Diameter message defined for a purpose other than overload control. In some embodiments, a Diameter overload scope may include a node, a realm, an application, a host, a group, a session, or a connection.

In some embodiments, overload associated with the Diameter overload scope may be detected. For example, DA 108 or DOC 110 may be configured to monitor one or more nodes, realms, applications, sessions, or other overload entities. Various monitoring techniques may be used in identifying or detecting overload, e.g., by polling, by subscribing to monitored nodes, or by receiving indications of overload from one or more monitored nodes.

In some embodiments, the method mentioned above may communicate the indication of the overload condition using one or more overload related attribute value pairs (AVPs) (e.g., Load-Info AVP 200) and may insert the one or more overload related AVPs into the Diameter message.

In some embodiments, the second Diameter node in the method mentioned above may use a received indication of the overload condition to abate load associated with a Diameter overload scope at the first Diameter node (e.g., DA 108) or a third Diameter node (e.g., a Diameter client 102).

In some embodiments, the second Diameter node in the method mentioned above may comprise an origination node for the Diameter message, a Diameter client, a Diameter server, a Diameter agent, DRN, or a DSR.

In some embodiments, the Diameter overload scope in the method mentioned above may include a node, a realm, an application, a host, a group, a session, or a connection.

In some embodiments, the first Diameter node in the method mentioned above may comprise a Diameter agent, a Diameter server, a Diameter client, a DRN, or a DSR.

In some embodiments, the Diameter message in the method mentioned above may comprise a Diameter session establishment request message that originates from a Diameter client, a Diameter session establishment response message that originates from a Diameter server, a Diameter request message, a Diameter response message, or a Diameter answer message.

In some embodiments, the method described above may include detecting overload associated with the Diameter overload scope includes detecting overload associated with a second Diameter node, a realm, an application, a host, a group, a session, or a connection.

In some embodiments, the indication of the overload in the method mentioned above may identify a session in an overload group corresponding to an overloaded Diameter node and the Diameter message.

In some embodiments, the second Diameter node in the method mentioned above may assign the Diameter message or a related session to an overload group and communicates the assignment to first Diameter node.

In some embodiments, the first Diameter node in the method mentioned above may utilize the overload groups assigned by the second Diameter node in communicating the indication of the overload.

In some embodiments, the first Diameter node in the method mentioned above may assign the Diameter message or the related session to an overload group that is different from the overload group assigned by the second Diameter node and uses the overload group assigned by the first Diameter node in communicating the indication of the overload.

In some embodiments, the first Diameter node in the method mentioned above may assign Diameter messages or related sessions having a first characteristic to a first overload group, assigns other Diameter messages or related sessions having a second characteristic to a second overload group, and, in response to detecting overload relating to the first characteristic, communicates an indication of overload to one or more originating nodes having communications assigned to the first overload group.

In some embodiments, a non-transitory computer readable medium may have stored thereon executable instructions that when executed by the processor of a computer control the computer to perform steps. The steps performed may include receiving, at a communications interface, a Diameter message and detecting an overload condition for a Diameter session associated with the Diameter message and communicating an indication of the overload condition to a second Diameter node using an existing Diameter message.

It will be understood that various details of the subject matter described herein may be changed without departing from the scope of the subject matter described herein. Furthermore, the foregoing description is for the purpose of illustration only, and not for the purpose of limitation.

What is claimed is:

1. A system for performing Diameter overload control, the system comprising:
    a Diameter server configured to, prior to detecting an overload condition, assign Diameter sessions to overload groups and to communicate the assignments to a Diameter routing node using Diameter messages containing Diameter overload control information, wherein the Diameter overload control information indicates that a first plurality of Diameter sessions are assigned to a first overload group and that a second plurality of Diameter sessions are assigned to a second overload group; and
    the Diameter routing node including:
    at least one network interface for receiving a second Diameter message related to one of the plurality of Diameter sessions, and
    a Diameter overload control unit configured to detect an overload condition associated with the second Diameter message and to communicate an indication of the overload condition to a plurality of Diameter nodes that originate the first plurality of Diameter sessions assigned to the first overload group using at least a third Diameter message defined for a purpose other than overload control.

2. The system of claim 1 wherein indication of the overload condition includes a Diameter overload scope.

3. The system of claim 2 wherein the Diameter overload scope includes one of a node, a realm, an application, a host, a group, a session, and a connection.

4. The system of claim 1 wherein the Diameter routing node comprises a Diameter agent, wherein the second Diameter message comprises a session establishment request originating from a Diameter client, wherein the Diameter agent detects the overload condition from the Diameter server providing service to the Diameter client.

5. The system of claim 1 wherein the Diameter routing node utilizes the overload groups assigned by the Diameter server in communicating the indication of the overload condition.

6. The system of claim 1 wherein the Diameter routing node assigns the sessions to overload groups that are different from the overload groups assigned by the Diameter server and uses the overload groups assigned by the Diameter routing node in communicating the indication of the overload condition.

7. The system of claim 1 wherein the Diameter agent assigns the sessions to overload groups.

* * * * *